(12) United States Patent
Kelly

(10) Patent No.: US 10,592,418 B2
(45) Date of Patent: Mar. 17, 2020

(54) CACHE SHARING IN VIRTUAL CLUSTERS

(71) Applicant: DELL PRODUCTS, LP, Round Rock, TX (US)

(72) Inventor: John Kelly, Cork (IE)

(73) Assignee: Dell Products, L.P., Round Rock, TX (US)

( * ) Notice: Subject to any disclaimer, the term of this patent is extended or adjusted under 35 U.S.C. 154(b) by 154 days.

(21) Appl. No.: 15/796,736

(22) Filed: Oct. 27, 2017

(65) Prior Publication Data
US 2019/0129855 A1    May 2, 2019

(51) Int. Cl.
*G06F 12/08* (2016.01)
*G06F 12/0868* (2016.01)
*G06F 12/084* (2016.01)

(52) U.S. Cl.
CPC ........ *G06F 12/0868* (2013.01); *G06F 12/084* (2013.01); *G06F 2212/314* (2013.01); *G06F 2212/6042* (2013.01)

(58) Field of Classification Search
CPC .............. G06F 12/0868; G06F 12/084; G06F 2212/314; G06F 2212/6042
See application file for complete search history.

(56) References Cited

U.S. PATENT DOCUMENTS

| | | | |
|---|---|---|---|
| 9,412,075 B2 | 8/2016 | Padala et al. | |
| 9,712,610 B2 * | 7/2017 | Ramasubramanian | ..................... H04L 67/1008 |
| 2004/0215883 A1* | 10/2004 | Bamford | ........... G06F 16/24552 711/129 |
| 2010/0235576 A1 | 9/2010 | Guthrie et al. | |
| 2014/0177636 A1 | 6/2014 | Jain et al. | |
| 2015/0046656 A1* | 2/2015 | Blinick | ............... G06F 12/0848 711/129 |
| 2015/0169497 A1* | 6/2015 | Fried | .................... G06F 12/0822 709/214 |
| 2016/0092255 A1* | 3/2016 | Bernal | ................ G06F 9/45558 718/1 |
| 2016/0188527 A1 | 6/2016 | Cherian et al. | |
| 2017/0004083 A1* | 1/2017 | Jain | ..................... G06F 12/0817 |
| 2018/0368123 A1* | 12/2018 | Mistry | .............. H04W 72/0406 |

FOREIGN PATENT DOCUMENTS

WO    WO 2017/127196 A1    7/2017

OTHER PUBLICATIONS

"Infiniswap Released on Githib" Mosharaf Chowdhury, Software Systems Laboratory, EECS, University of Michigan, May 24, 2017, pp. 1-3; http://www.mosharaf.com/blog/tag/infiniswap/.

* cited by examiner

*Primary Examiner* — Ryan Bertram
(74) *Attorney, Agent, or Firm* — Larson Newman, LLP

(57) ABSTRACT

Shared memory caching resolves latency issues in computing nodes associated with a cluster in a virtual computing environment. A portion of random access memory in one or more of the computing nodes is allocated for shared use by the cluster. Whenever local cache memory is unable in one of the computing nodes, a cluster neighbor cache allocated in a different computing node may be utilized as remote cache memory. Neighboring computing nodes may thus share their resources for the benefit of the cluster.

20 Claims, 10 Drawing Sheets

CACHE SHARING IN VIRTUAL CLUSTERS

FIELD OF THE DISCLOSURE

The present disclosure generally relates to information handling systems, and more particularly relates to memory sharing between physical nodes in a compute cluster.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Shared memory caching mitigates latency issues in computing nodes associated with a cluster in a virtual computing environment. A portion of random access memory in one or more of the computing nodes is allocated for shared use by the cluster. Whenever local cache memory is unavailable in one of the computing nodes, a cluster neighbor cache allocated in a different computing node may be utilized as remote cache memory. Neighboring computing nodes may thus share their resources for the benefit of the cluster.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
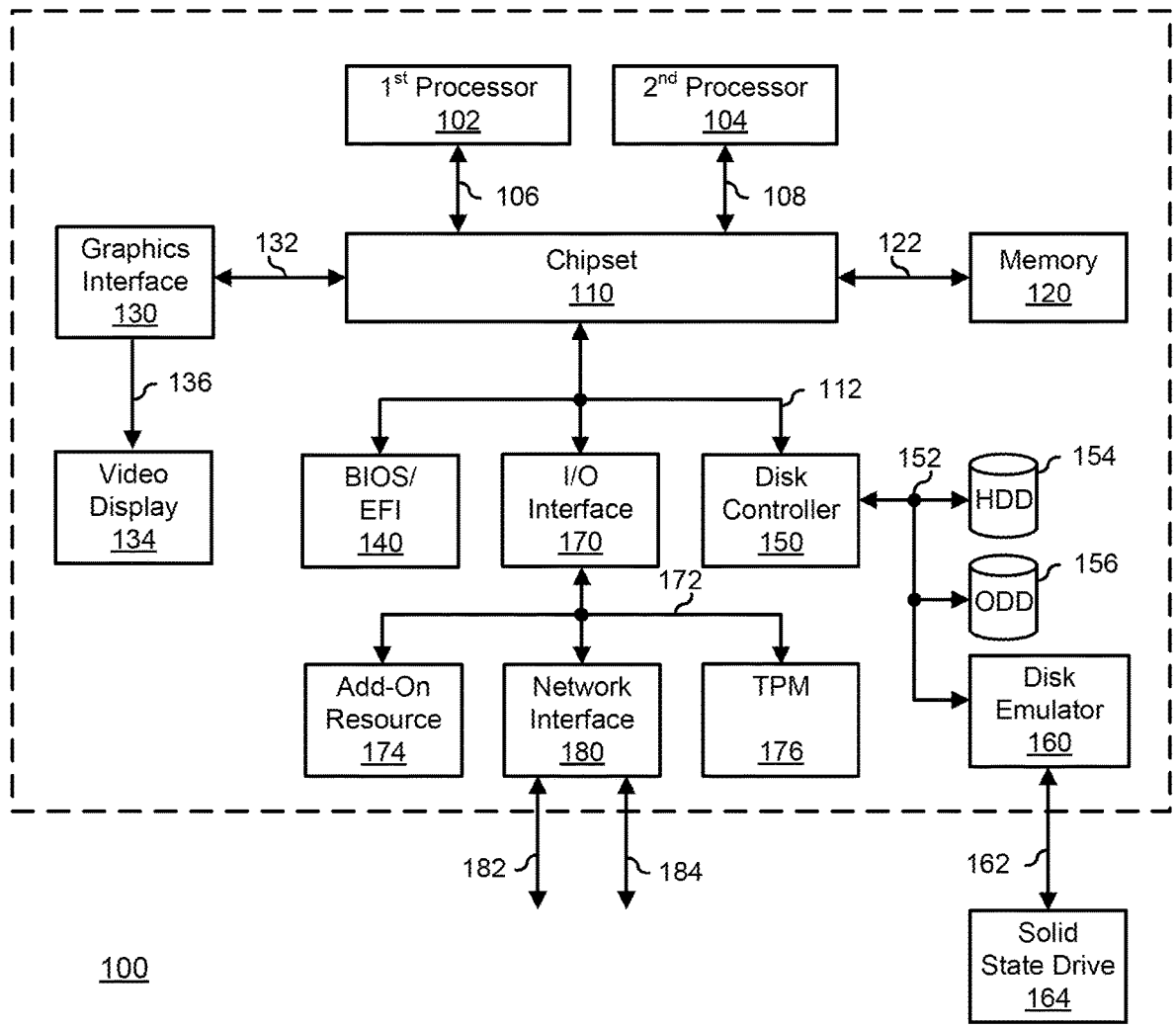
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
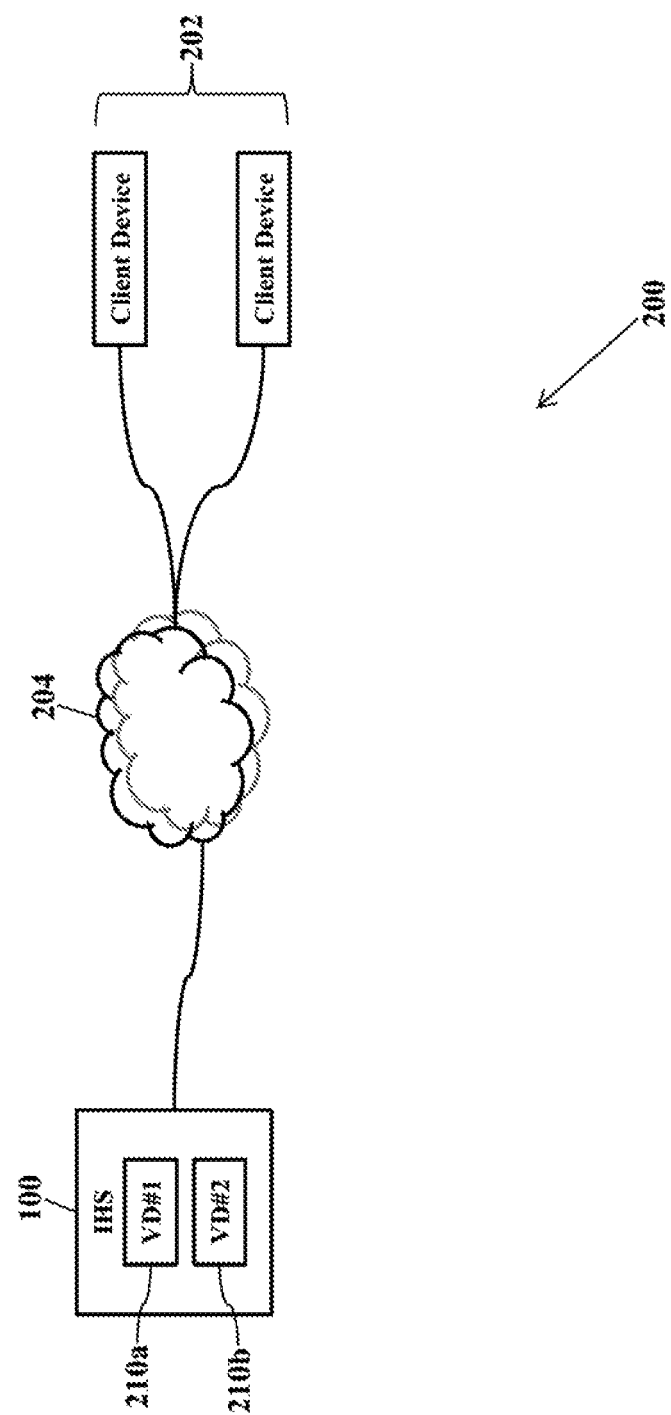
FIGS. 2-3 illustrate a virtual computing environment, according to exemplary embodiments.
Figure 3:
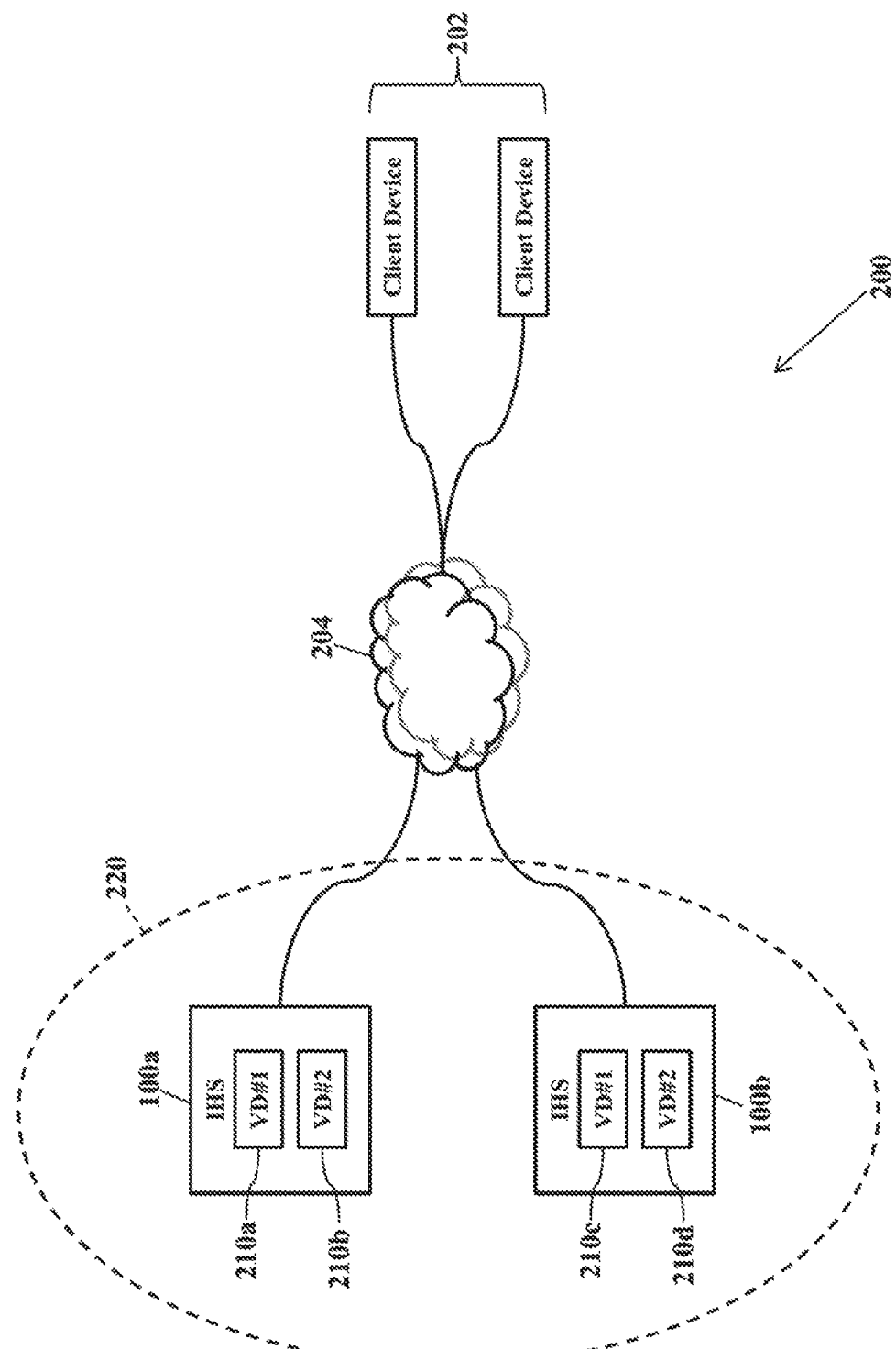

FIGS. 2-3 illustrate a virtual computing environment 200, according to exemplary embodiments. Here the information handling system 100 may provide virtual computing and/or virtual hardware resources to one or more client devices 202. While FIG. 2 only illustrates a few client devices 202, in practice there may be many client devices, perhaps even hundreds or thousands of client machines. Regardless, the information handling system 100 may lend or share its hardware, computing, and programming resources with one of the client devices 202. The client devices 202 communicate with the information handling system 100 using a communications network 204 to send and receive electronic data. The electronic data is packetized into packets of data according to a packet protocol (such as any of the Internet Protocols). The packets of data contain bits or bytes of data describing the contents, or payload, of a message. A header of each packet of data may contain routing information identifying an origination address and/or a destination address. The information handling system 100 and the client devices 202 may thus inspect the packets of data for routing information.

The virtual computing environment 200 shares resources. The communications network 204 thus allows the information handling system 100 to operate as a virtual, remote resource. Virtual computing is well known, so this disclosure need not delve into the known details. Suffice it to say that the information handling system 100 may present or operate as one or more virtual desktops (VD) or machines 210. Each one of the virtual desktops 210 may provide some processing or application resource to any of the client devices 202. While FIG. 2 only illustrates two virtual desktops 210*a* and 210*b*, the number or instantiations may be several or even many, depending on complexity and resources.

FIG. 3 illustrates a cluster 220 in the virtual computing environment 200. There may be any number of information handling systems 100 operating as nodes in the cluster 220. Clustering is usually carried out to provide high availability (i.e., redundancy in the case of node failure). For simplicity, though, FIG. 3 only illustrates two (2) of the information handling systems (illustrated, respectively, as reference numerals 100*a* and 100*b*). Each one of the information handling systems 100*a* and 100*b* may thus host multiple virtual desktops (such as 210*a* through 210*d*). The virtual computing environment 200 may thus present shared resources for hundreds or thousands of the client devices 202. The information handling systems 100*a* and 100*b* may communicate using the packetized communications network 204, as is known.

Memory sharing may be desired. As the virtual computing environment 200 may provide resources to hundreds or thousands of the client devices 202, optimal management techniques may be desired. As the client devices 202 make requests for data or processing, some of the shared resources may be over utilized. The virtual computing environment 200 may thus share cache memory among the information handling systems 100 in the cluster 220.

Figure 4:
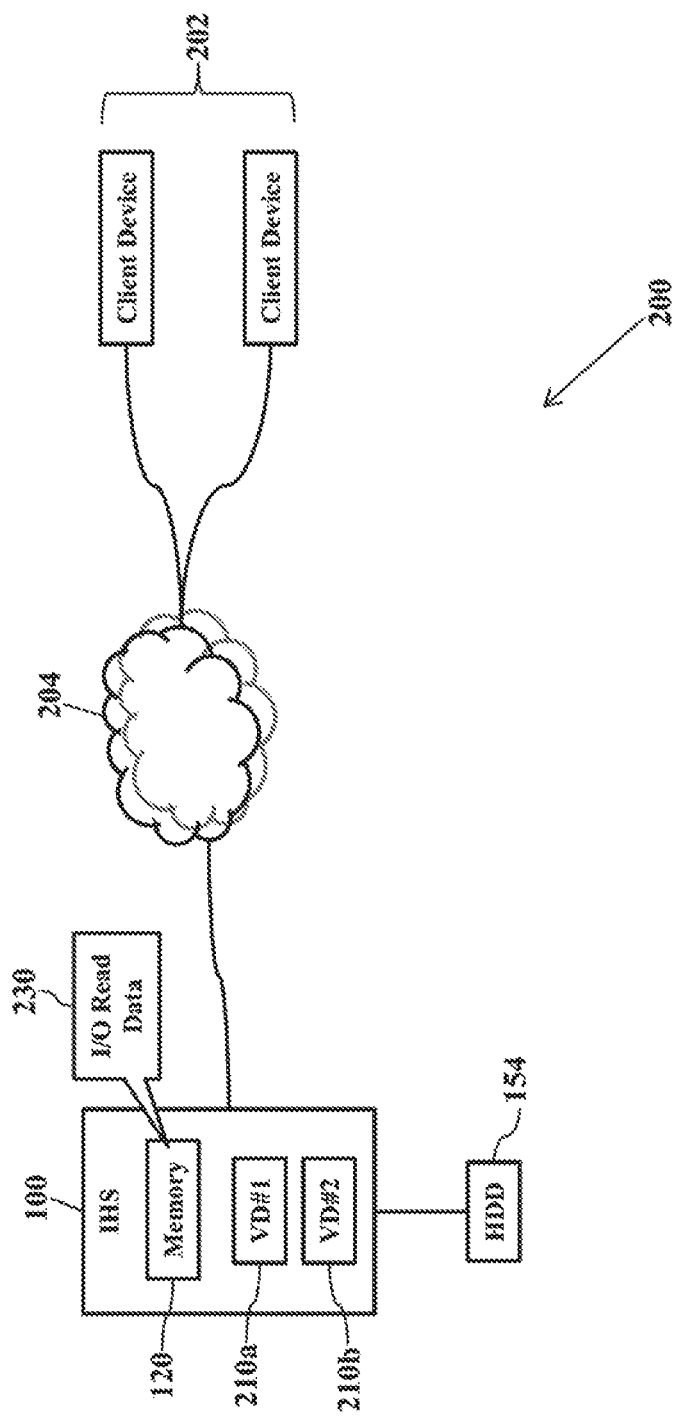
FIGS. 4-5 illustrate cache sharing, according to exemplary embodiments.
Figure 5:
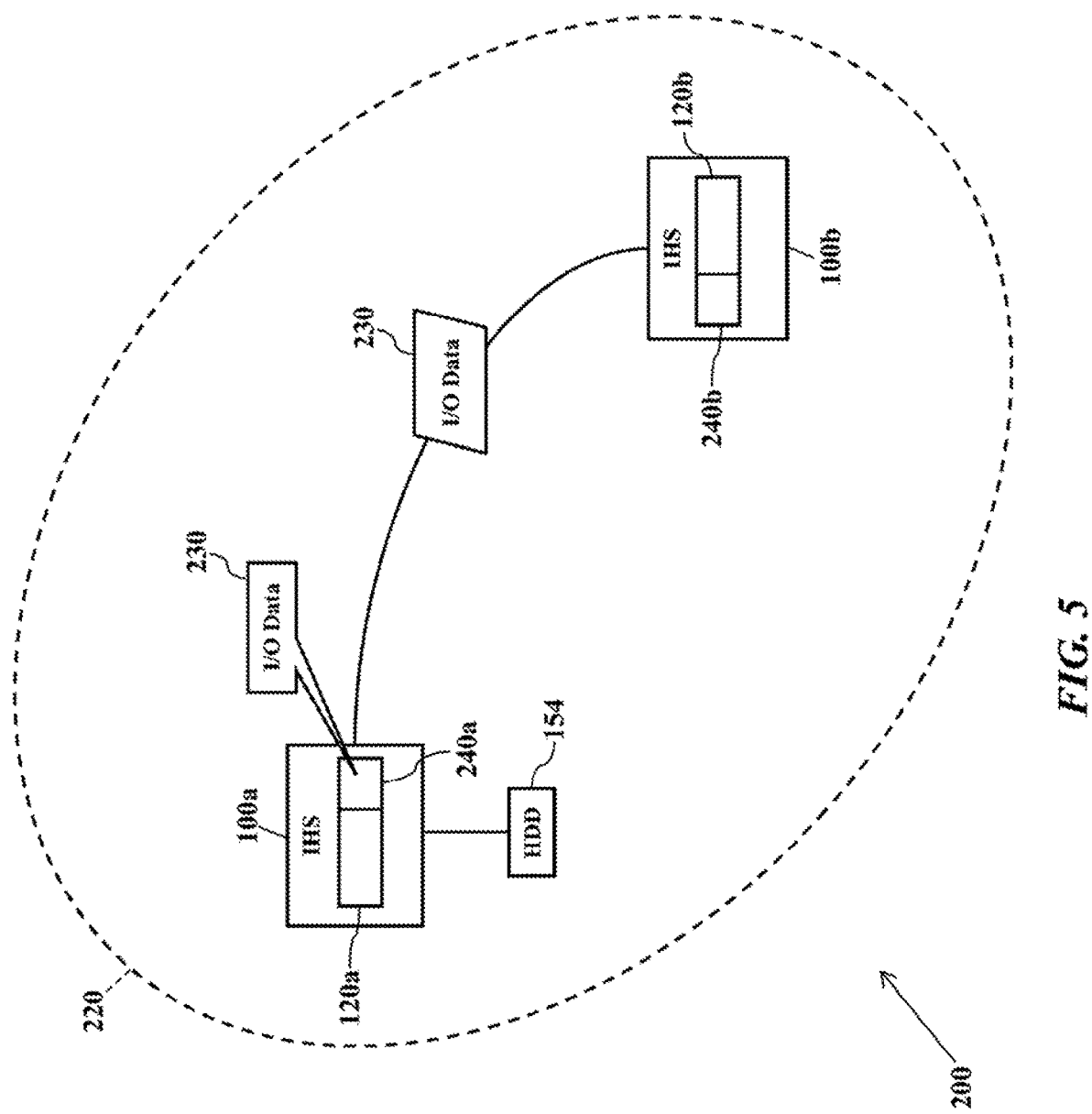

FIGS. 4-5 illustrate cache sharing, according to exemplary embodiments. Here exemplary embodiments may share cache memory within the cluster 220. When the information handling system 100 provides virtual resources to any client device 202, input/output (I/O) data 230 may be generated. As the reader may understand, the I/O data 230 is received, sent, and/or generated when communicating with input/output devices. This disclosure will mainly describe the I/O data 230 when reading data from, or writing data to, the hard disk drive (HDD) 154. The I/O data 230, though, may be obtained when reading and writing to any hardware peripheral (such as an optical drive, keyboard, monitor/display, printer, or USB memory device). FIG. 4 illustrates the I/O data 230 being stored in the memory 120 (such as RAM) of the information handling system 100. The I/O data 230, however, may be locally stored in other memory devices or remotely stored at any accessible/addressable location using the communications network 204. The I/O data 230 may be one or more disk blocks, with each disk block being a sequence of bits or bytes of data having a character length. Exemplary embodiments may optimize caching of frequently used disk blocks to the memory 120. Some popular disk blocks may be cached to the RAM 120, so the capacity of the information handling system 100 to accept disk I/O requests without latency may be increased, as a higher percentage of these requests will be redirected to RAM. A greater percentage of the I/O operations per second (IOPS) will thus be cached to RAM, thus increasing the capacity of the host machines in the virtual computing environment 200.

FIG. 5 further illustrates the virtual computing environment 200. In FIG. 5, the virtual computing environment 200 has the multiple nodes or hosts (such as the information handling systems 100a and 100b) arranged or clustered as the cluster 220. The nodes 100a and 100b in the cluster 220 may thus generate many disk blocks of the I/O data 230. Indeed, in actual implementation, as each one of the information handling systems 100a and 100b provides virtual resources, the cluster 220 may store and retrieve millions or even trillions of the disk blocks of the I/O data 230.

Exemplary embodiments may thus share cache memory for the I/O data 230. Each computing node in the cluster 220 may create a configurable portion of its respective cache memory 120 for shared use. For example, information handling system 100a allocates a cluster neighbor cache 240a in its RAM 120a. The cluster neighbor cache 240a is available for use by the other information handling system 100b within the cluster 220. The information handling system 100b, similarly, allocates its corresponding cluster neighbor cache 240b in its RAM 120b. The cluster neighbor cache 240b is available for use by the other information handling system 100a. Again, FIG. 5 is a simple illustration of the two-nodal cluster 220. In actual practice, though, the cluster 220 may have several or even many computer nodes, with each node designating its corresponding cluster neighbor cache 240 for shared use. Each cluster neighbor cache 240a and 240b may be reserved to the cluster member nodes for caching of the I/O data 230. Each node, in other words, sets aside or allocates a predetermined amount of the RAM memory 120 as a read cache for disk read instructions from the local node, plus an additional portion of the RAM memory 120 is set aside as the cluster neighbor cache 240 for usage by other nodes in the cluster 220. Computing nodes may thus share their individual cache memory for the benefit of the cluster 220.

Exemplary embodiments may thus dynamically manage the RAM memory 120. Exemplary embodiments may use the remote direct memory access (RDMA) protocol to minimize access latency in the cluster neighbor cache 240. When the I/O data 230 is read from the hard disk drive 154, exemplary embodiments may first attempt to store or cache the I/O data 230 to its local RAM 120a. However, if for any reason, the local RAM 120a is full or otherwise unavailable, the information handling system 100a may send the I/O data 230 (via the communications network 204 illustrated in FIG. 4) to the cluster neighbor cache 240b established in the information handling system 100b. When the information handling system 100a later needs the I/O data 230, the information handling system 100a may then call, query, and/or retrieve the I/O data 230 from the cluster neighbor cache 240b established in the information handling system 100b.

Polling schemes may be used. While any prioritization or scheduling scheme may be used, exemplary embodiments may sequentially poll the neighboring cluster member nodes for availability. When cache memory sharing is implemented, exemplary embodiments may poll cluster nodes for status and availability. The information handling system 100a, for example, may poll the information handling system 100b for an available capacity of its cluster neighbor cache 240b. A larger cluster 220, of course, would have more nodes, so exemplary embodiments may store or maintain a dynamic member list of cluster nodes that participate in cache memory sharing. Once any or all of the cluster neighbor caches 240 in the cluster 220 have been fully populated, cluster nodes may then use their normal cache replacement policies (such as First-In, First-Out, Least-Frequently Used, and other known overwrite schemes) to replace any old I/O data 230.

Figure 6:
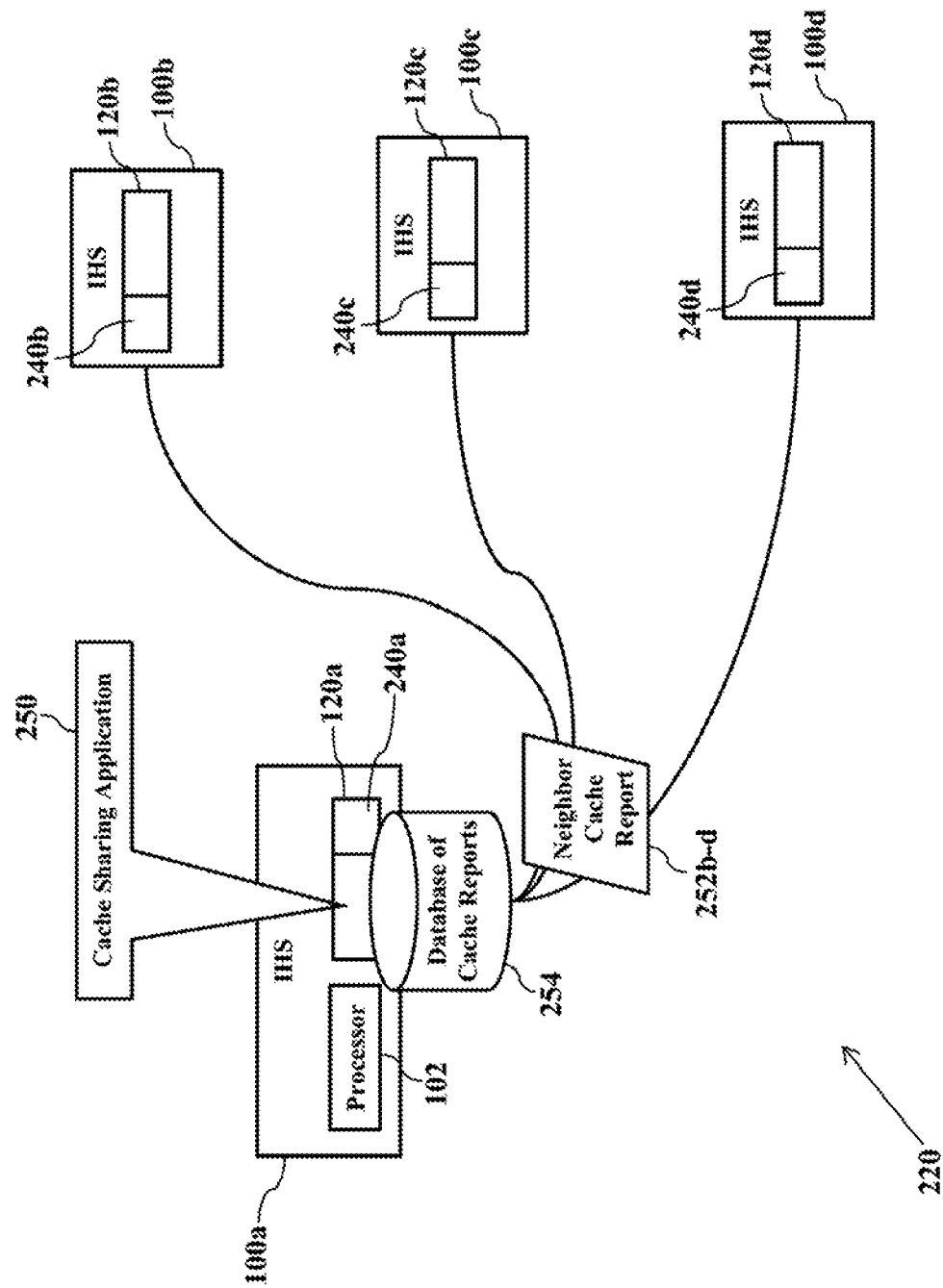
FIGS. 6-8 illustrate more details of cache sharing, according to exemplary embodiments.
Figure 7:
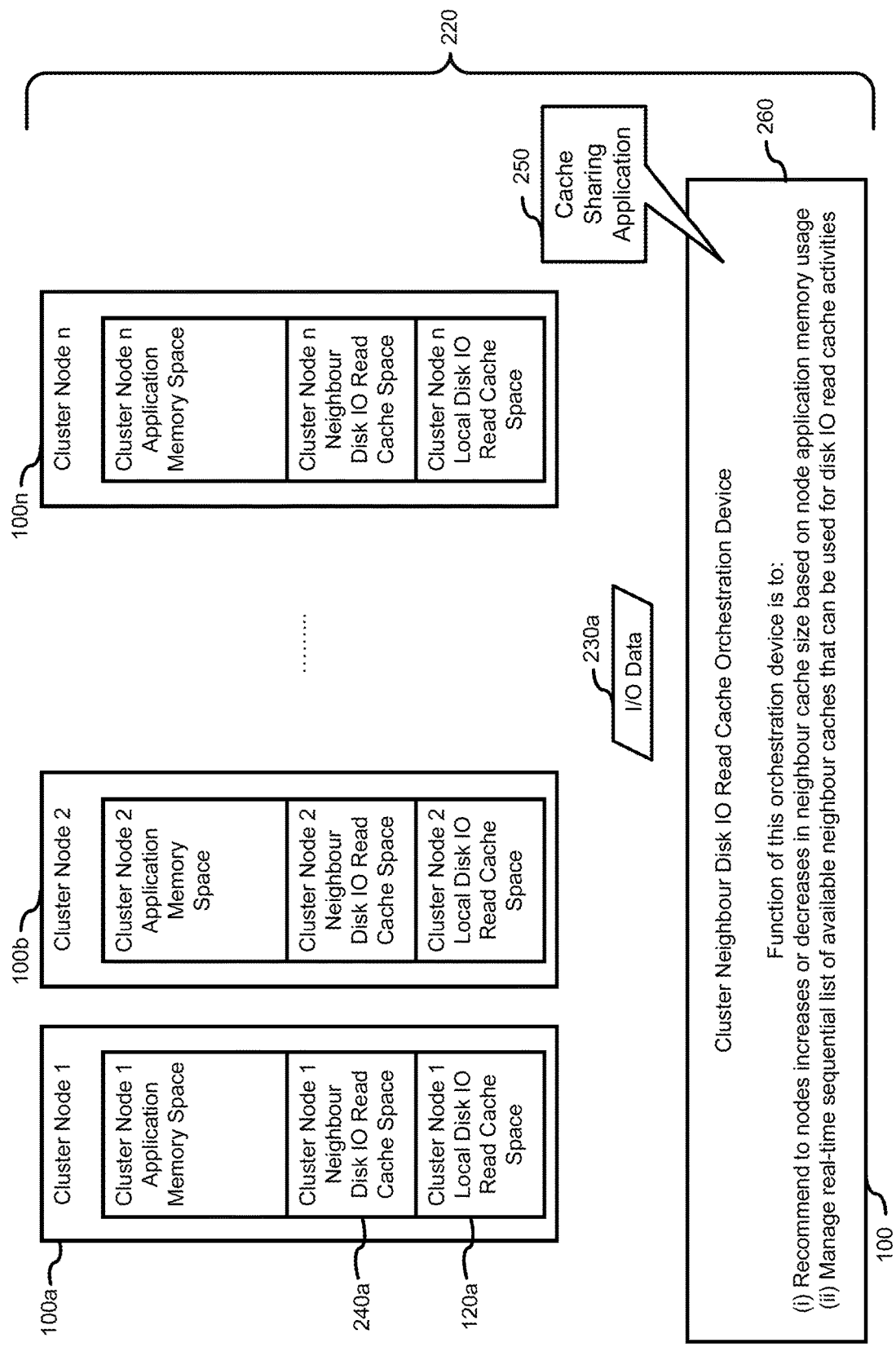
Figure 8:
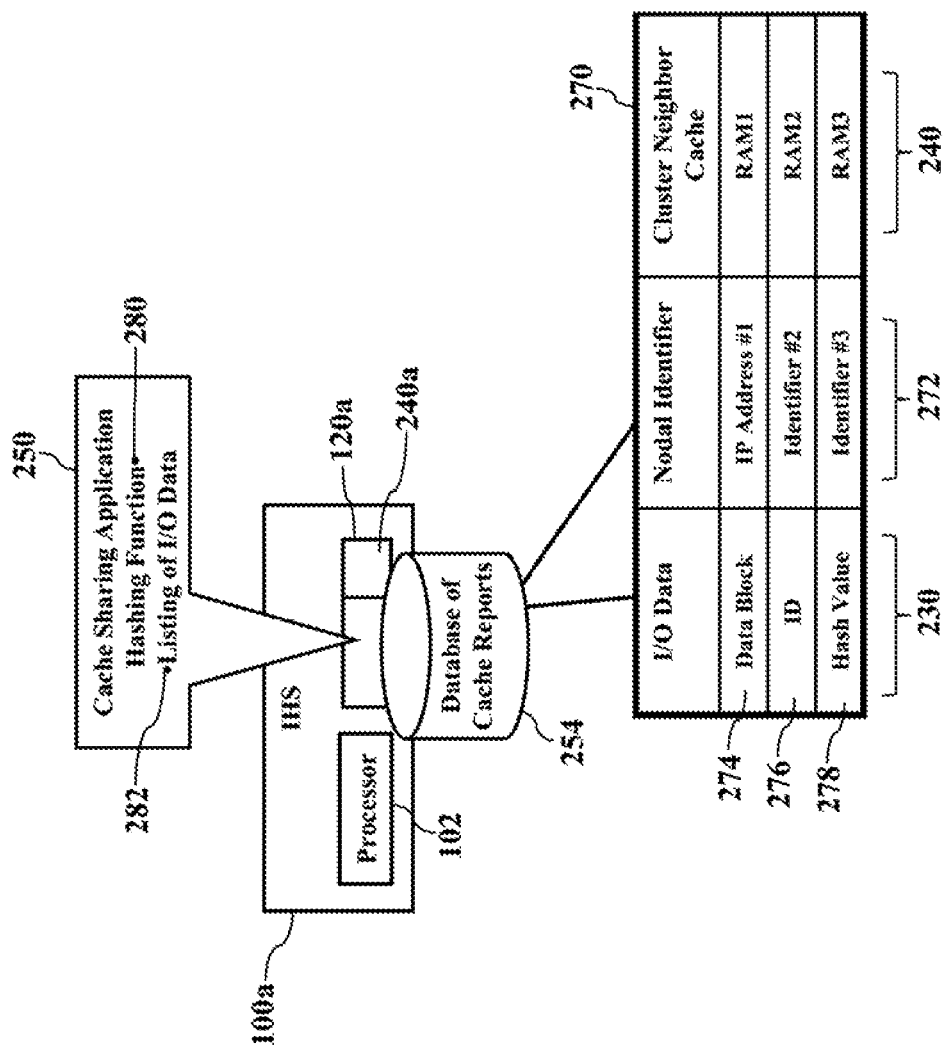

FIGS. 6-8 illustrate more details of cache sharing, according to exemplary embodiments. Here the processor 102 of the information handling system 100a executes a cache sharing application 250. FIG. 6 illustrates the cache sharing application 250 stored within the local memory 120a, but the cache sharing application 250 may be stored in some other local or remotely accessible memory. Regardless, the cache sharing application 250 instructs the processor 102 to perform operations, such as allocating the cluster neighbor cache 240a and tracking its dynamic size at various reporting times. Furthermore, the information handling system 100a may also perform management functions for the cluster 220 and receive neighbor cache reports 252 from member nodes. Each neighbor cache report 252 is sent from a corresponding neighbor node (such as information handling systems 100b-d). Each respective neighbor cache report 252b-d identifies the cluster node (perhaps with a unique identifier) and specifies an available size (such as bytes) of its corresponding cluster neighbor cache 240b-d (perhaps with a timestamp). The cache sharing application 250 may poll the member nodes 100b-d for their respective neighbor cache reports 252b-d. The cache sharing application 250 may recommend, or even command or instruct, a particular member node to increase or decrease the size of its cluster neighbor cache 240b-d based on historical entries in an electronic database 254 of the neighbor cache reports 240. The cache sharing application 250 may log and analyze past neighbor cache reports 252 to identify historical usage (such as historical low and high memory usage, size, allocation, and other factors). The cache sharing application 250 may track the cluster neighbor cache 240b -d reported by each member node and dynamically vary its size in relation to current and/or historical need.

As FIG. 7 illustrates, exemplary embodiments may designate a cluster neighbor cache orchestration device 260.

The cache sharing application 250 may cause the cluster neighbor cache orchestration device 260 to manage the member nodes 100a-n in the cluster 220. That is, the cache sharing application 250 may be configured with administrative or management functions that are reserved for any information handling system 100 that orchestrates the cache memory sharing within the cluster 220. Each member node 100a-n allocates a portion of its local RAM memory 120a-n as the cluster neighbor cache 240a-n. Other portions of the local RAM memory 120a-n may be allocated for local storage of the I/O data 230a and application memory space. If the local RAM memory 120a is unable to accommodate the I/O data 230, exemplary embodiments may send or transfer the I/O data 230a to a network address (such as IP address) associated with a different member node 100b-n, perhaps as arranged or instructed by the cluster neighbor cache orchestration device 260. The I/O data 230a is thus remotely stored by a different node 100b-n in the cluster 220. Exemplary embodiments may thus track the nodal destination for any disk blocks representing the I/O data 230.

FIG. 8 illustrates even more details. Here the electronic database 254 may log or track any of the I/O data 230 transferred within the cluster 220. For simplicity, FIG. 8 illustrates the electronic database 254 as a table 270 that electronically maps, relates, or associates the different disk blocks (representing the I/O data 230) to their corresponding nodal location (such as unique nodal identifier 272 and cluster neighbor cache 240 within the cluster 220). The I/O data 230 may be actual bit values of disk block(s) 274, a unique identifier 276, and/or a hash value 278. In short, whenever the I/O data 230 is shared within the cluster 220, exemplary embodiments may document or record an origination machine, a destination machine, and a time/date for subsequent or future retrieval. The electronic database 254 may thus be a central repository for the I/O data 230 being shared or hosted by the virtual desktops 210 in the cluster 220. Exemplary embodiments may thus query the electronic database 254 for a content representation of the I/O data 230 and identify or retrieve the cluster neighbor cache 240 representing its current storage location. Exemplary embodiments may also conversely query for the current storage location (such as the cluster neighbor cache 240) and identify or retrieve the corresponding I/O data 230 stored thereby.

Exemplary embodiments thus describe a marketplace computing device which uses off-host memory for disk IO caching, thus solving two fundamental concerns in modern IT environments—slow disk read time and the CPU power outpacing memory capacity (causing increased likelihood of memory shortages on individual nodes). This can be particularly useful in go-to-market approaches such as the ready-node approach for software defined storage environments, where hardware nodes are brought to market in a state that is "ready" for certain software defined storage environments (such as VMware VSAN, Dell EMC ScaleIO, and Microsoft Storage Spaces Direct). Exemplary embodiments thus allow for market differentiation and greater cluster performance.

Hashing may be used. The electronic database 254 identifies the I/O data 230 shared within the cluster 220. While exemplary embodiments may represent the I/O data 230 using any scheme, hash values may be preferred. That is, the hash value 278 may be determined for each disk block (representing the I/O data 230) using a hashing function 280. Hashing is well known and need not be explained. Suffice it to say that the electronic database 254 may store electronic database associations between different hash values 278 and the nodal identifier 272 associated with the cluster neighbor cache 240. When any I/O data 230 is hashed (using the hashing function 280), its corresponding hash value 278 may be determined and an entry added to the electronic database 254. The electronic database 254 may thus be used to track which hash values 278 are being shared by which ones of the cluster nodes. Exemplary embodiments may thus generate a listing 282 of the I/O data 230 shared within the cluster 220.

Exemplary embodiments may monitor for duplicates. The listing 282 of the I/O data 230 may also be sorted or arranged to reveal processing opportunities. For example, exemplary embodiments track identical I/O data 230 (perhaps via their respective hash values 278) to eliminate duplicate sharing requests. Moreover, duplicate I/O data 230 may be eliminated or deleted from multiple machines, thus ensuring that each cluster neighbor cache 240 is efficiently used.

Exemplary embodiments overcome latency issues. Conventional schemes only locally cache I/O read data to RAM memory. These conventional local caching schemes mean that nodes with high application memory usage will only be able to facilitate the caching of a small amount of disk IO to RAM, as the conventional schemes will only be able to host a small disk IO read cache. Some conventional schemes attempt to solve the problem of memory imbalance in a compute cluster by using RDMA to expose all of a cluster's memory to a user application using an RDMA based approach. However, this RDMA exposure is only applicable to applications and does not reveal disk I/O cache. Moreover, other schemes may intelligently vary cache memory for disk I/O read caches based on node memory usage. That is, local cache is restricted to a single host and do not do anything to utilize an imbalance in memory usage in a cluster to increase availability of memory read cache resources.

Figure 9:
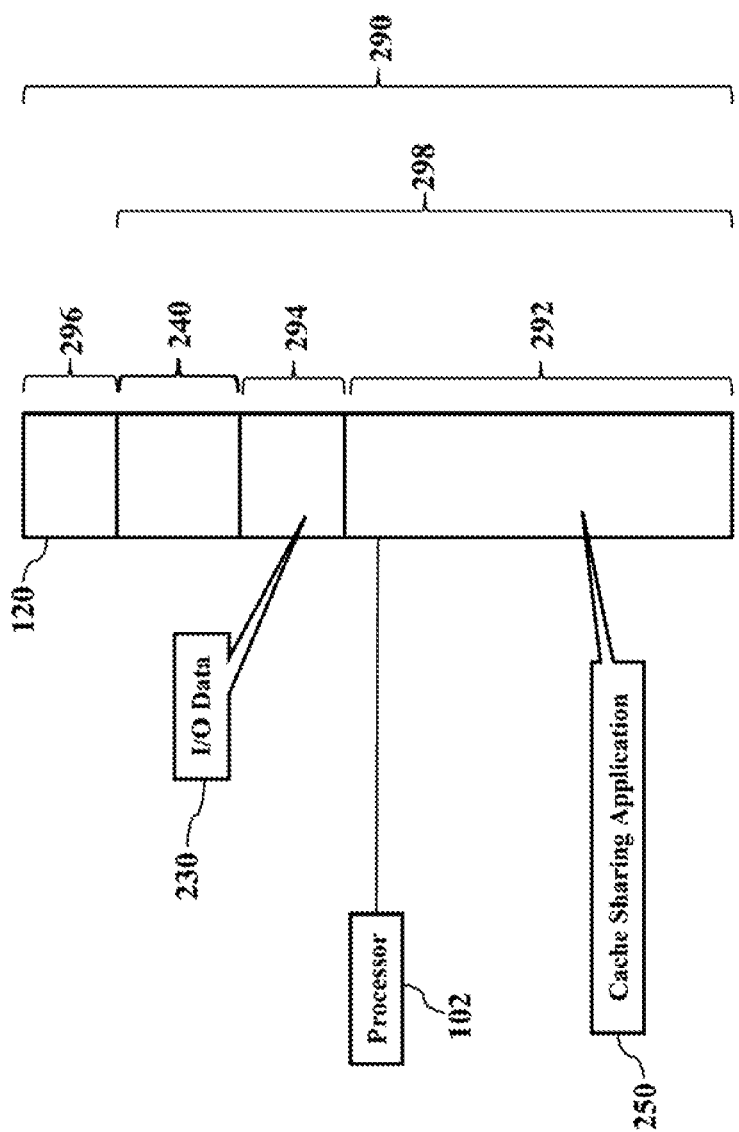
FIG. 9 illustrates memory sizing, according to exemplary embodiments.

FIG. 9 illustrates memory sizing, according to exemplary embodiments. Here exemplary embodiments may size the cluster neighbor cache 240 according to cluster needs. Suppose, for example, that the memory 120 has a total capacity 290 of thirty-two gigabytes (32 GB). A portion of the memory 120 may be allocated as a software/firmware application memory space 292 (perhaps storing the cache sharing application 250). Another portion of the memory 120 may be reserved as local cache 294 for local caching of the I/O data 230 (that is, local storage for disk blocks associated with local input/output read requests). Still another portion of the memory 120 may be allocated to the cluster neighbor cache 240 for shared use of neighboring nodes in the cluster 220 (illustrated in FIGS. 3 and 5). A headroom 296 represents a remaining capacity of the memory 120. The headroom 296 may be defined as a difference between the total application memory space (such as 32 GB) and the peak application memory usage (perhaps as historically revealed by the electronic database 254). The peak application memory usage is generally a summation 298 of the application memory space 292, the local cache 294, and the cluster neighbor cache 240. In practice, then, the headroom 296 may dynamically fluctuate in byte size in response to real time memory usage. Indeed, the cache sharing application 250 may adjust the byte size of the application memory space 292, the local cache 294, the cluster neighbor cache 240, and/or the headroom 296 according to present, real time needs. Multiple nodes or hosts within the cluster 220 may thus utilize the cluster neighbor cache 240 of a single machine.

Figure 10:
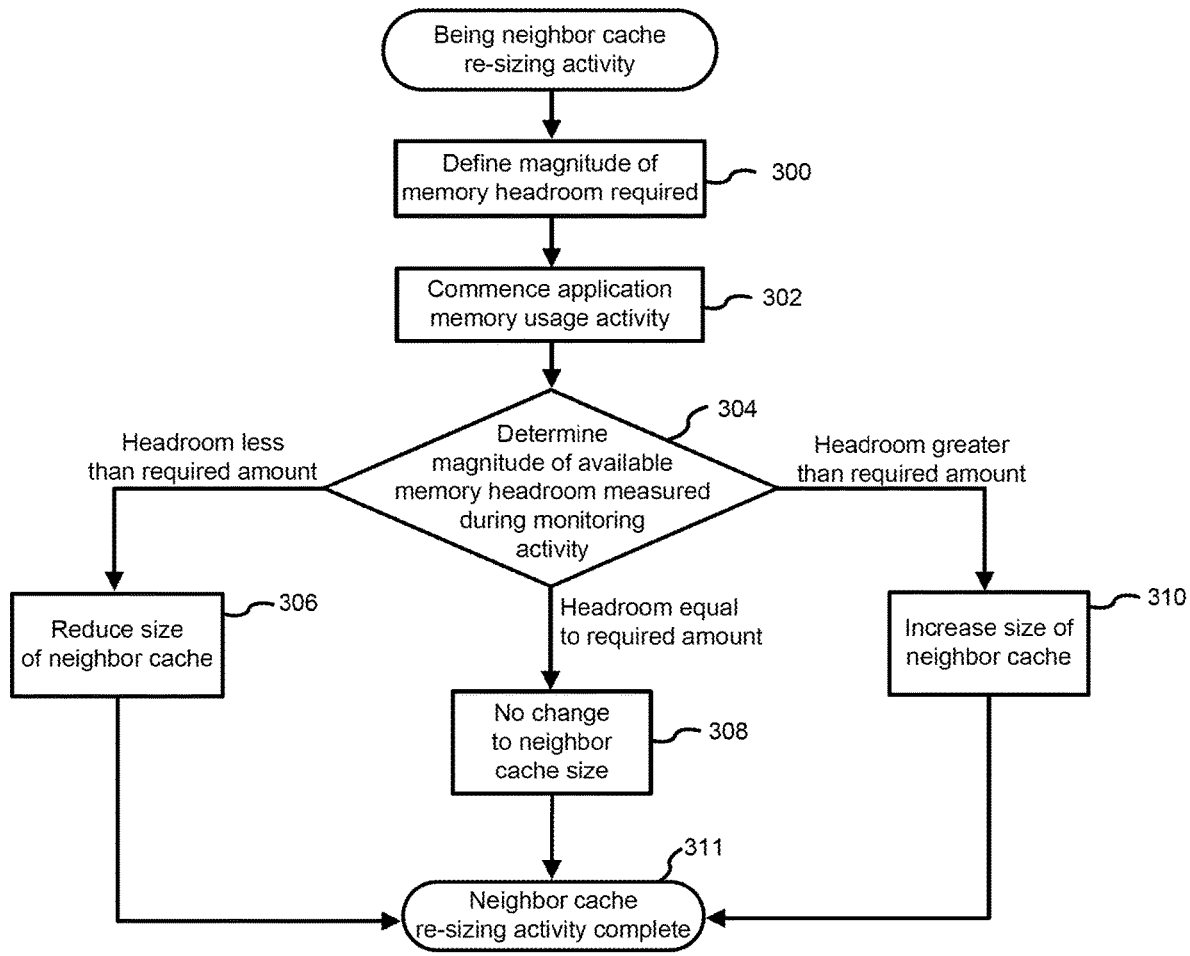
FIG. 10 is a flowchart illustrating a method or algorithm for cache sharing, according to exemplary embodiments.

FIG. 10 shows a method or algorithm for cache sharing between multiple nodes in the cluster 220, according to exemplary embodiments. Exemplary embodiments may define or specify a minimum byte size of the headroom 296 partitioned within the memory 120 (Block 300). When cache memory sharing commences (Block 302), exemplary embodiments monitor the real-time byte size of the headroom 296 based on current usage requirements (such as illustrated in FIG. 9). A current or available byte size or value of the headroom 296 is compared to the minimum byte size of the headroom 296 (Block 304). If the available headroom 296 is less than the minimum byte size (Block 304), then the cluster neighbor cache 240 may be reduced in size to increase the size of the headroom 296 (Block 306). The size of the cluster neighbor cache 240, in other words, may be sacrificed in order to satisfy or attain the minimum byte size of the headroom 296. If the available headroom 296 is equal to its minimum byte size (Block 304), then the cluster neighbor cache 240 may be correctly sized such that no resizing need occur (Block 308). If the available headroom 296 is greater than its minimum byte size (Block 304), then the byte size of the cluster neighbor cache 240 may be increased to increase or improve cache storage capacity (Block 310). Exemplary embodiments may repeat the headroom 296 calculation at any time or according to a periodic re-evaluation.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
   receiving, by a processor operating in a computing node, a disk block associated with a hard disk drive, the computing node associated with a cluster in a virtual computing environment;
   determining, by the processor, a local random-access memory operating in the computing node is unavailable for a storage of the disk block;
   transferring, by the processor, the disk block to a cluster neighbor cache operating in a neighbor node associated with the cluster in the virtual computing environment, the neighbor node establishing the cluster neighbor cache as a shared resource for the storage of the disk block associated with the cluster; and
   adding, by the processor, an entry to an electronic database that logs the transferring of the disk block, the electronic database electronically associating the cluster neighbor cache to the disk block and to the neighbor node as a destination machine;
   wherein the cluster neighbor cache remotely stores the disk block in response to the local random-access memory being unavailable.

2. The method of claim 1, further comprising retrieving the disk block from the cluster neighbor cache operating in the neighbor node associated with the cluster.

3. The method of claim 1, further comprising querying the cluster neighbor cache to retrieve the disk block from the neighbor node associated with the cluster.

4. The method of claim 1, further comprising storing a hash value representing the disk block.

5. The method of claim 4, further comprising electronically associating the hash value to an identifier associated with the cluster neighbor cache.

6. The method of claim 1, further comprising electronically associating the disk block to the computing node as an origination machine.

7. The method of claim 1, further comprising electronically associating a hash value representing the disk block to the neighbor node.

8. The method of claim 1, further comprising polling the neighbor node for an available capacity of the cluster neighbor cache.

9. The method of claim 8, further comprising receiving a neighbor cache report sent from the neighbor node responsive to the polling, the neighbor cache report specifying the available capacity of the cluster neighbor cache.

10. The method of claim 1, further comprising sizing the cluster neighbor cache.

11. An information handling system associated with a cluster in a virtual computing environment, the information handling system comprising:
- a processor; and
- a local random-access memory accessible to the processor, the local random-access memory storing instructions that when executed cause the processor to perform operations, the operations comprising:
  - receiving a disk block associated with a hard disk drive;
  - determining the local random-access memory is unavailable for a cache storage of the disk block;
  - transferring the disk block to a cluster neighbor cache operating in a neighbor computing node associated with the cluster in the virtual computing environment, the neighbor computing node establishing the cluster neighbor cache as a shared resource for the cache storage of the disk block associated with the cluster; and
  - adding an entry to an electronic database that logs the transferring of the disk block, the electronic database electronically associating the cluster neighbor cache to the disk block and to the neighbor computing node as a destination machine;
  - wherein the cluster neighbor cache remotely stores the disk block in response to the local random-access memory being unavailable.

12. The system of claim 11, wherein the operations further include retrieving the disk block from the cluster neighbor cache operating in the neighbor computing node associated with the cluster.

13. The system of claim 11, wherein the operations further include querying the cluster neighbor cache to retrieve the disk block from the neighbor computing node associated with the cluster.

14. The system of claim 11, wherein the operations further include storing a hash value representing the disk block.

15. The system of claim 11, wherein the operations further include electronically associating the hash value to an identifier associated with the cluster neighbor cache.

16. The system of claim 11, wherein the operations further include electronically associating the disk block to the computing node as an origination machine.

17. The system of claim 11, wherein the operations further include electronically associating a hash value representing the disk block to the neighbor node.

18. A memory device storing instructions that when executed cause a processor to perform operations, the operations comprising:
- receiving a disk block associated with a hard disk drive;
- determining a local random-access memory is unavailable for a cache storage of the disk block;
- transferring the disk block via a communications network to a cluster neighbor cache operating in a neighbor computing node associated with a cluster in a virtual computing environment, the neighbor computing node establishing the cluster neighbor cache as a shared resource for the cache storage of the disk block associated with the cluster; and
- adding an entry to an electronic database that logs the transferring of the disk block, the electronic database electronically associating the cluster neighbor cache to the disk block and to the neighbor computing node as a destination machine;
- wherein the cluster neighbor cache remotely stores the disk block in response to the local random-access memory being unavailable.

19. The memory device of claim 18, wherein the operations further include retrieving the disk block from the cluster neighbor cache operating in the neighbor computing node associated with the cluster.

20. The memory device of claim 18, wherein the operations further include querying the cluster neighbor cache to retrieve the disk block from the neighbor computing node associated with the cluster.

* * * * *